(12) United States Patent
Zaloga et al.

(10) Patent No.: US 8,262,110 B2
(45) Date of Patent: Sep. 11, 2012

(54) IDLER ARM ASSEMBLY ADJUSTMENT

(75) Inventors: Miroslaw Zaloga, Shelby Township, MI (US); George E. Doerr, Clarkson, MI (US); Christopher J. Mielke, Shelby Township, MI (US); William R. Venner, III, Milford, MI (US); Marco E. Rodriguez, Macomb Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 366 days.

(21) Appl. No.: 12/758,836

(22) Filed: Apr. 13, 2010

(65) Prior Publication Data

US 2011/0248461 A1   Oct. 13, 2011

(51) Int. Cl.
*B62D 7/16* (2006.01)
(52) U.S. Cl. ............ 280/93.509; 280/93.508; 280/86.75; 280/93.511; 403/149
(58) Field of Classification Search ............... 280/86.75, 280/93.507–93.511, 93.502; 403/145, 148, 403/149
See application file for complete search history.

(56) References Cited

U.S. PATENT DOCUMENTS

| | | | | | |
|---|---|---|---|---|---|
| 3,112,123 | A | * | 11/1963 | True | 280/93.509 |
| 3,135,540 | A | * | 6/1964 | Herbenar | 403/124 |
| 3,369,848 | A | * | 2/1968 | Gerner | 384/218 |
| 3,434,763 | A | * | 3/1969 | Gerner | 384/218 |
| 5,765,844 | A | * | 6/1998 | Wood | 280/93.509 |
| 6,371,682 | B1 | * | 4/2002 | Maughan | 403/165 |
| 2010/0207340 | A1 | * | 8/2010 | Elterman et al. | 280/93.508 |

* cited by examiner

*Primary Examiner* — Ruth Ilan

(57) ABSTRACT

An idler arm assembly employed in a steering assembly of a vehicle having a body. The idler arm assembly comprises: an idler housing mounted to the body and including a bore; a pivot shaft mounted in the bore and being rotatable and telescopically slidable in the bore, with the pivot shaft having a cavity at a first end; an idler arm having a first end supported by the second end of the pivot shaft and a second end that supports the steering assembly; a ball stud having a ball end secured in the cavity and supporting the pivot shaft in the telescopically slidable direction, and a shank having threads; and a threaded cap secured to the idler housing and engaged with the threads on the shank, whereby rotation of the threads relative to the threaded cap will telescopically slide the pivot shaft relative to the idler housing.

15 Claims, 3 Drawing Sheets

IDLER ARM ASSEMBLY ADJUSTMENT

BACKGROUND OF INVENTION

The present invention relates generally to a steering assembly for a vehicle and more particularly to an idler arm assembly having a height adjustment.

In automotive vehicles, it is desirable to maintain the steering assembly level relative to the vehicle. If not level, then the vehicle front end alignment, tire wear and vehicle handling may be less than optimum. As a result, it is important to assure that the height of an idler arm corresponds to the height of an arm attached to the steering gear assembly. However, tolerances and other build variations can lead to a vehicle with a steering linkage that is not level.

In order to account for the build variations, some have provided slotted holes where the steering attaches to brackets on the body structure of the vehicle. However, using slotted holes for adjustment can be more time consuming and imprecise than is desired.

SUMMARY OF INVENTION

An embodiment contemplates an idler arm assembly employed in a steering assembly of a vehicle having a body. The idler arm assembly comprises: an idler housing mounted to the body and including a bore; a pivot shaft mounted in the bore and being rotatable and telescopically slidable in the bore, with the pivot shaft having a cavity at a first end and an opposed second end; an idler arm having a first end supported by the second end of the pivot shaft and a second end that supports a portion of the steering assembly; a ball stud having a ball end secured in the cavity and supporting the pivot shaft in the telescopically slidable direction, and a shank having threads; and a threaded cap secured to the idler housing and engaged with the threads on the shank, whereby rotation of the threads relative to the threaded cap will telescopically slide the pivot shaft relative to the idler housing.

An embodiment contemplates a method of adjusting the height of an idler arm assembly, in a steering assembly of a vehicle, relative to a vehicle body, the method comprising the steps of: mounting a first end of an idler arm of the idler arm assembly to a relay rod; mounting a second, opposed end of the idler arm assembly to a first end of a pivot shaft retained in a bore of an idler housing; securing a ball end of a ball stud to a second, opposed end of the pivot shaft to telescopically support the pivot shaft in the bore; threadably securing a shank of the ball stud to a threaded cap fixed to the idler housing; mounting the idler housing to the vehicle body; detecting if a height of the idler arm requires adjusting; and rotating the ball stud relative to the threaded cap to thereby adjust the pivot shaft telescopically relative to the idler housing, whereby the height of the idler arm is adjusted relative to the vehicle body.

An advantage of an embodiment is that the relay rod can be repositioned to level the steering assembly by adjusting the height of the idler arm relative to the vehicle body. The idler arm height can be quickly and precisely adjusted by employing an idler arm assembly having an adjustable ball joint that allows a pivot shaft to be raised and lowered relative to an idler housing. The height adjustment allows for a properly oriented steering assembly, which allows for optimum vehicle handling. Moreover, the height adjustment can be readily made either in-plant during vehicle assembly or by a service technician after the vehicle is in-service. This, in turn, may reduce warranty costs since adjustments can be made without replacing any parts.

DETAILED DESCRIPTION

Figure 1:
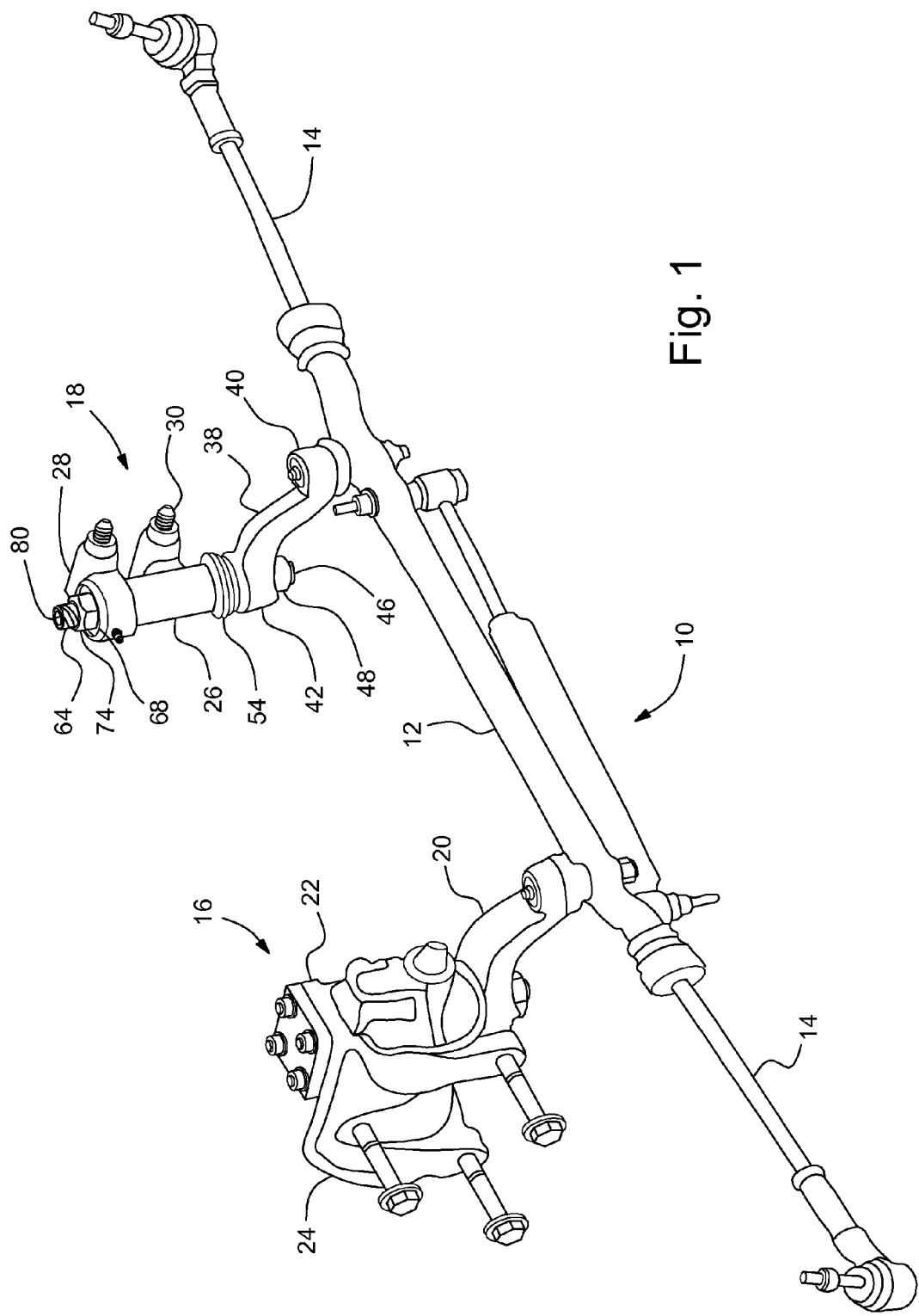
FIG. 1 is a perspective view of a steering assembly.

Referring to FIG. 1, a steering assembly 10 for a vehicle is shown. The steering assembly 10 includes a relay rod 12 that extends laterally across the vehicle. The relay rod 12 connects to a pair of tie rods 14, one at each end of the relay rod 12. The tie rods 14 connect to wheel steering structure that can be conventional and so will not be shown or discussed herein. Two assemblies mount to and support the relay rod 12, a steering gear assembly 16 and an idler arm assembly 18. The steering gear assembly 16 has an arm 20 that pivotally connects, at a first end, to the relay rod 12. The arm 20 connects, at a second end, to a steering gear housing 22, which includes a steering gear mount 24 that mounts to vehicle body structure. The steering gear assembly 16 may be conventional and so will not be discussed in more detail herein.

Figure 2:
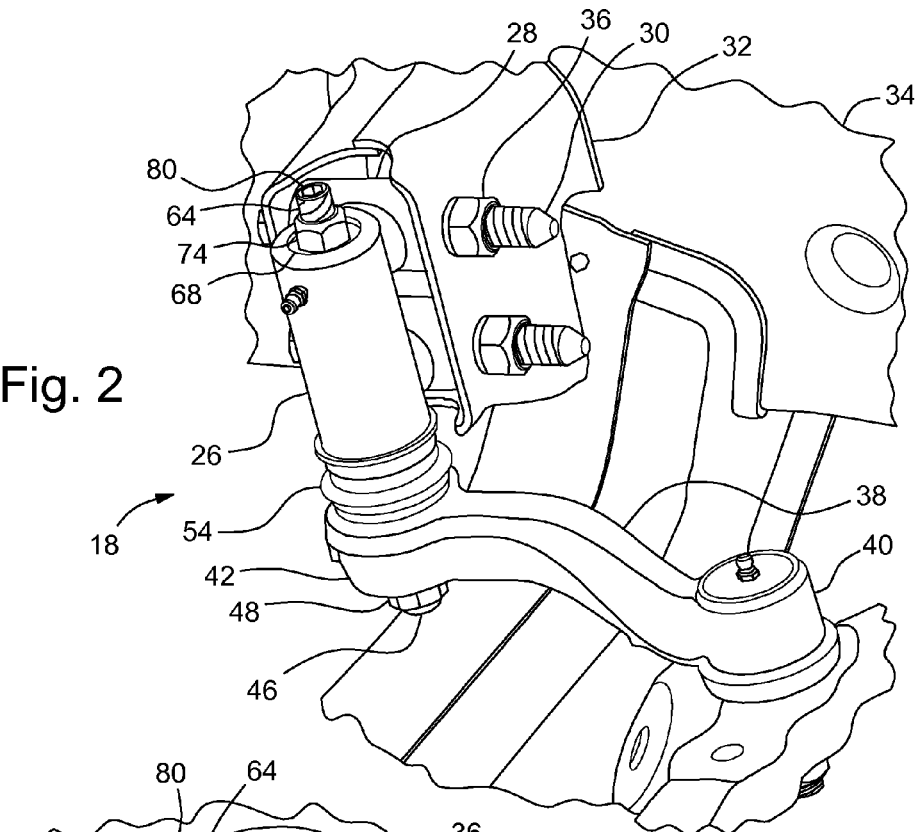
FIG. 2 is a perspective view of a portion of the steering assembly mounted to a vehicle body.
Figure 3:
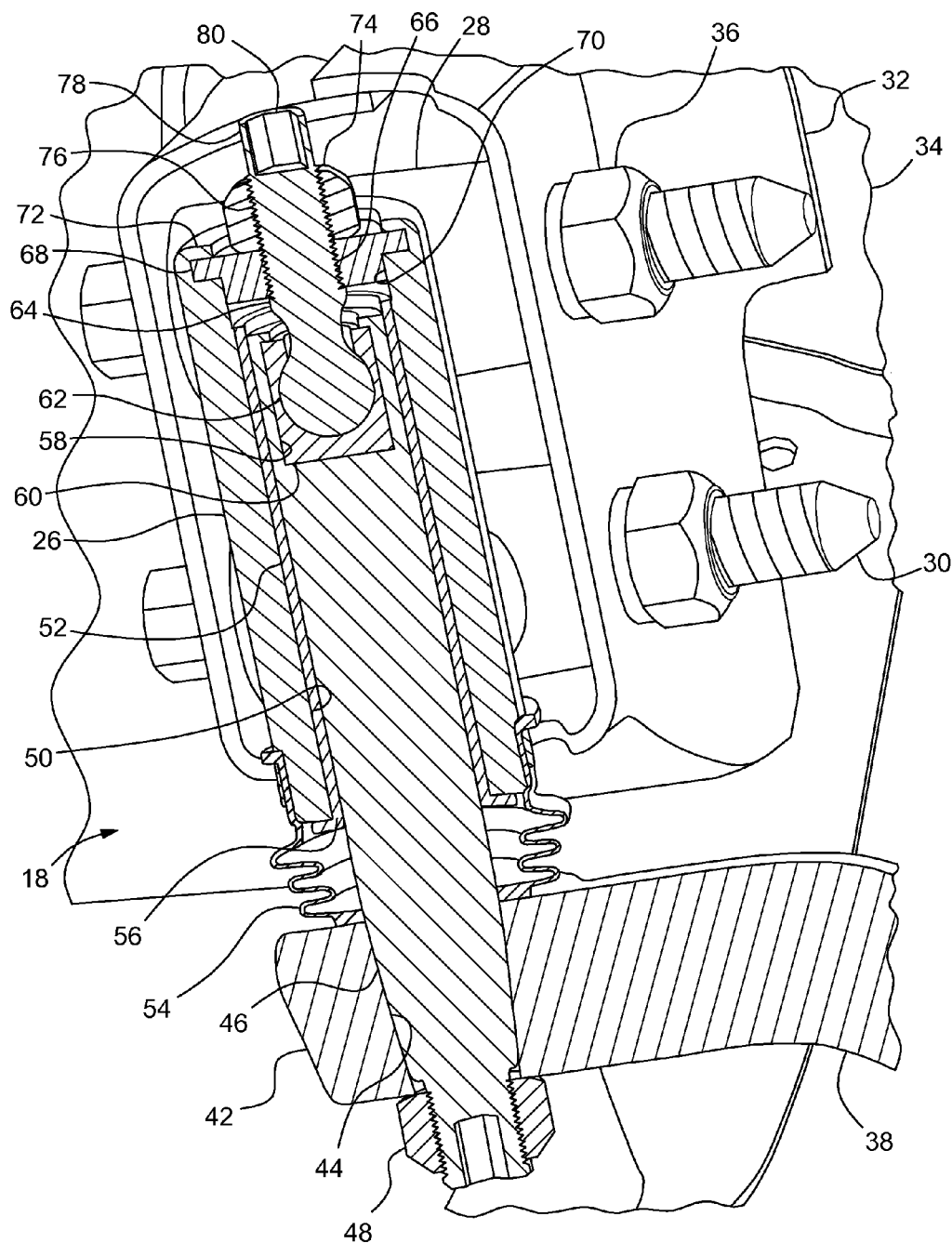
FIG. 3 is a partial cross section view of a portion of the steering assembly mounted to the vehicle body.

The idler arm assembly 18 will be discussed with reference to FIGS. 1-3. The idler arm assembly 18 includes an idler housing 26 to which a pair of idler assembly mounts 28 are affixed. The idler assembly mounts 28 each have a mounting bolt 30 extending therethrough. The mounting bolts 30 also extend through holes in a mounting bracket 32 that is affixed to body structure 34 of the vehicle. Nuts 36, in combination with the mounting bolts 30, allow the idler arm assembly 18 to be mounted to the vehicle body.

The idler arm assembly 18 also includes an idler arm 38 that is pivotally mounted, at a first end 40, to the relay rod 12. A second end 42 of the idler arm 38 includes a bore 44 through which a pivot shaft 46 extends. A nut 48 secures the pivot shaft 46 to the idler arm 38. The pivot shaft 46 extends up into a bore 50 extending through the idler housing 26 and can pivot relative to the idler housing 26. A liner 52 may extend between the bore 50 and the pivot shaft 46, making pivoting between the two easier. Also, a flexible seal 54 may be secured between the idler arm 38 and the idler housing 26 to keep contaminants from entering a lower end 56 of the bore 50.

The pivot shaft 46 has a cavity 58 open to an upper end of the shaft. A ball seat 60 is fitted into the cavity 58 and receives a ball end 62 of an adjustable ball stud 64. The ball stud 64 has a shank 66 extending upward from the ball end 62, with the shank having threads 76 on its exterior surface. A threaded cap 68 is screwed onto the threads 76 of the shank 66 and is secured in an upper end 70 of the bore 50. The threaded cap 68 may be secured in the idler housing 26 by bending a flange 72 over the top of the threaded cap 68 after the ball seat 60, the ball stud 64 and the threaded cap 68 have been inserted into the bore 50. A lock nut 74 is threaded onto the threads 76 and secured against the threaded cap 68. The upper end 78 of the shank 66 (opposite the ball end) includes a tool engagement feature 80. The tool engagement feature 80 is a feature that allows one to engage the shank 66 with a tool in order to rotate the ball stud 64 relative to the threaded cap 68. In the exemplary embodiment shown in FIGS. 2 and 3, the tool engagement feature 80 is a hexagonal shaped recess that allows a tool, such as an Allen wrench (also called a hex key), to be inserted into the recess and turned to cause the ball stud 64 to rotate. Other types of tool engagement features may be employed instead, if so desired.

The installation and adjustment of the steering assembly 10 to the body structure 34 will now be discussed with reference to FIGS. 1-3. The assembled steering assembly 10 may be lifted up under the body structure 34, with the steering gear mount 24 aligned with holes (not shown) in the body structure (or a bracket extending from the body structure), and with the idler assembly mounts 28 aligned with corresponding holes in the mounting bracket 32. The bolts for the steering gear assembly and the mounting bolts 30 for the idler arm assembly 18 are inserted and the nuts secured thereon to secure the steering assembly 10 to the body structure 34.

At this point, the orientation of the relay rod 12 can be measured and if the arm 20 from the steering gear assembly 16 and the idler arm 38 do not line up sufficiently to cause the relay rod 12 to be at the desired orientation, the idler arm assembly 18 can be adjusted to account for this. The adjustment is made by loosening the lock nut 74 so that it is not in contact with the threaded cap 68. One then inserts the tool into the tool engagement feature 80 on the end of the shank 66 and rotates it in the direction desired to raise or lower the ball stud 64. Since the ball end 62 is secured in the ball seat 60, which, in turn, is fixed in the cavity 58 of the pivot shaft 46, raising or lowering of the ball stud 64 will correspondingly raise or lower the pivot shaft 46. As the pivot shaft 46 is pulled into or pushed farther out of the bore 50 in the idler housing 26, which is fixed in height relative to the body structure 34, it will raise or lower the idler arm 38. The threads 76 on the shank 66 allow for precision in adjusting the height in the axial direction of the pivot shaft 46. After the idler arm 38 has reached the desired height to properly orient the relay rod 12, the lock nut 74 is tightened against the threaded cap 68 to maintain this desired position.

Figure 4:
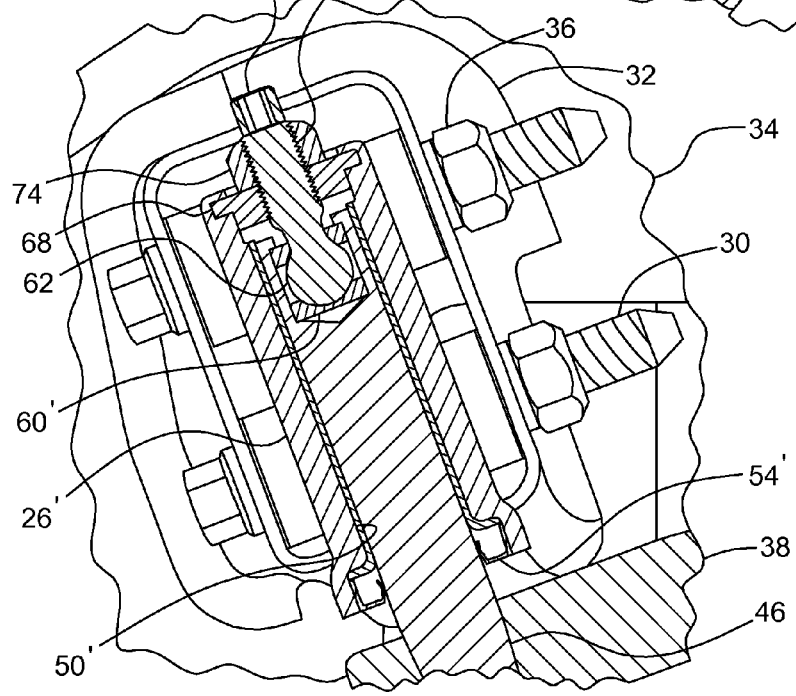
FIG. 4 is a view similar to FIG. 3, but illustrating an alternate embodiment.

FIG. 4 illustrates a second embodiment. Since this embodiment is a modified version of the first, and to avoid repetition of description, like reference numerals designate corresponding parts in the drawings and detailed description thereof will be omitted. Modified elements will be given reference numbers with an added prime. The ball seat 60' is a two-piece design, with a lower portion and an upper portion supporting the ball end 62 of the ball stud 64. Also, the lower end of the idler housing 26' flares out to create a wider portion of the bore 50' in order to allow for mounting of a seal 54' between the pivot shaft 46 and the idler housing 26'. This seal 54' keeps contaminants from getting into the bore 50' and may be any shape or size desired for allowing axial and rotational movement between the pivot shaft 46 and the idler housing 26' so long as it will keep the contaminants out of the bore 50'.

While certain embodiments of the present invention have been described in detail, those familiar with the art to which this invention relates will recognize various alternative designs and embodiments for practicing the invention as defined by the following claims.

What is claimed is:

1. An idler arm assembly employed in a steering assembly of a vehicle having a body, the idler arm assembly comprising:
   an idler housing configured to mount to the body and including a bore extending therethrough;
   a pivot shaft mounted in the bore and being rotatable and telescopically slidable in the bore, the pivot shaft having a cavity at a first end and an opposed second end;
   an idler arm having a first end supported by the second end of the pivot shaft and a second end that is configured to support a portion of the steering assembly;
   a ball stud having a ball end secured in the cavity and supporting the pivot shaft in the telescopically slidable direction, and a shank having threads thereon; and
   a threaded cap secured to the idler housing and being threadably engaged with the threads on the shank, whereby rotation of the threads relative to the threaded cap will telescopically slide the pivot shaft relative to the idler housing.

2. The idler arm assembly of claim 1 wherein the ball stud includes a tool engagement feature proximate to an end of the shank on the opposed end of the ball stud from the ball end, and the tool engagement feature is configured to be engaged by a tool to cause rotation of the ball stud relative to the threaded cap.

3. The idler arm assembly of claim 2 wherein the tool engagement feature is a hexagonal recess in the shank.

4. The idler arm assembly of claim 1 including a lock nut threaded onto the threads of the shank and selectively engageable with the threaded cap to prevent rotation of the ball stud relative to the threaded cap.

5. The idler arm assembly of claim 1 including a liner mounted in the bore between a wall of the bore and the pivot shaft.

6. The idler arm assembly of claim 1 including a ball seat secured in the cavity, the ball seat securing the ball end in the cavity.

7. The idler arm assembly of claim 6 wherein the ball seat has two separate pieces, a first piece engaging a first portion of the ball end and a second piece, spaced from the first piece, engaging a second portion of the ball end.

8. The idler arm assembly of claim 1 including a seal configured to prevent contaminants from entering the bore between the pivot shaft and a wall of the bore.

9. The idler arm assembly of claim 8 wherein the seal is a flexible seal that is secured at a first end to the idler housing around an opening of the bore and secured at a second, opposed end to the idler arm.

10. The idler arm assembly of claim 8 wherein the seal is a flexible seal that is mounted between the pivot shaft and the bore adjacent to an opening of the bore.

11. A method of adjusting the height of an idler arm assembly, in a steering assembly of a vehicle, relative to a vehicle body, the method comprising the steps of:
   (a) mounting a first end of an idler arm of the idler arm assembly to a relay rod;
   (b) mounting a second, opposed end of the idler arm assembly to a first end of a pivot shaft retained in a bore of an idler housing;
   (c) securing a ball end of a ball stud to a second, opposed end of the pivot shaft to telescopically support the pivot shaft in the bore;
   (d) threadably securing a shank of the ball stud to a threaded cap fixed to the idler housing;
   (e) mounting the idler housing to the vehicle body;
   (f) detecting if a height of the idler arm requires adjusting; and
   (g) rotating the ball stud relative to the threaded cap to thereby adjust the pivot shaft telescopically relative to the idler housing, whereby the height of the idler arm is adjusted relative to the vehicle body.

12. The method of claim 11 including step (h) threading a lock nut onto the shank against the threaded cap to prevent rotation of the shank relative to the threaded cap.

13. The method of claim 11 wherein step (g) is further defined by engaging a tool in a tool engagement feature formed on the shank and actuating the tool to cause rotation of the ball stud.

14. The method of claim 11 including step (h) sealing around the pivot shaft adjacent to an opening in the bore proximate the idler arm to prevent contaminants from getting into the bore.

15. The method of claim 11 wherein step (e) is further defined by affixing bolts to idler assembly mounts extending from the idler housing and to a bracket affixed to the vehicle body.

* * * * *